United States Patent
Chen

(10) Patent No.: US 7,257,866 B2
(45) Date of Patent: Aug. 21, 2007

(54) STRAP-ADJUSTING DEVICE

(75) Inventor: Shun-Min Chen, Taipei (TW)

(73) Assignee: Wonderland Nurserygoods Co., Ltd., Neihu, Taipei (TW)

( * ) Notice: Subject to any disclaimer, the term of this patent is extended or adjusted under 35 U.S.C. 154(b) by 37 days.

(21) Appl. No.: 10/972,994

(22) Filed: Oct. 25, 2004

(65) Prior Publication Data

US 2006/0085953 A1  Apr. 27, 2006

(51) Int. Cl.
*A47D 1/10* (2006.01)
(52) U.S. Cl. ............................. 24/171; 24/194; 24/196; 24/136 K; 297/476
(58) Field of Classification Search .................. 24/171, 24/194, 196, 115 G, 136 K; 297/476, 250.1
See application file for complete search history.

(56) References Cited

U.S. PATENT DOCUMENTS

| | | | |
|---|---|---|---|
| 3,928,895 A | | 12/1975 | Klink |
| 4,336,636 A | * | 6/1982 | Ishiguro et al. .......... 24/115 M |
| 4,506,417 A | | 3/1985 | Hara |
| 5,471,714 A | * | 12/1995 | Olson ........................... 24/171 |
| 6,425,632 B1 | * | 7/2002 | Anthony et al. .......... 297/250.1 |
| 6,820,310 B2 | * | 11/2004 | Woodard et al. ............... 24/171 |

2003/0030311 A1  2/2003  Woodard et al.

FOREIGN PATENT DOCUMENTS

| | | |
|---|---|---|
| EP | 0 582 559 A2 | 2/1994 |
| EP | 0 582 559 A3 | 2/1994 |
| EP | 582559 A3 * | 3/1994 |

OTHER PUBLICATIONS

JP 11332617 A, Dec. 7, 1999, pp. 31-32.
Search Report Under Section 17(5).

* cited by examiner

*Primary Examiner*—Judy Swann
*Assistant Examiner*—Marcus Menezes
(74) *Attorney, Agent, or Firm*—Ladas & Parry, LLP

(57) ABSTRACT

A strap-adjusting device includes a base frame, a cover member, a strap holder, and a biasing member. The cover member cooperates with the base frame to form a strap-operating space, and is formed with a strap hole unit. The strap holder is movable in the strap-operating space between a strap-retaining position and a strap-releasing position, is accessible via an opening in the base frame, and forms a strap passage unit in the strap-operating space. The biasing member is disposed in the strap-operating space to provide a biasing force for urging the strap holder to the strap-retaining position. A strap is extended into and out of the strap-operating space via the strap hole unit, and extends along the strap passage unit. The strap holder is able to clamp the strap when the strap holder is at the strap-retaining position.

17 Claims, 6 Drawing Sheets

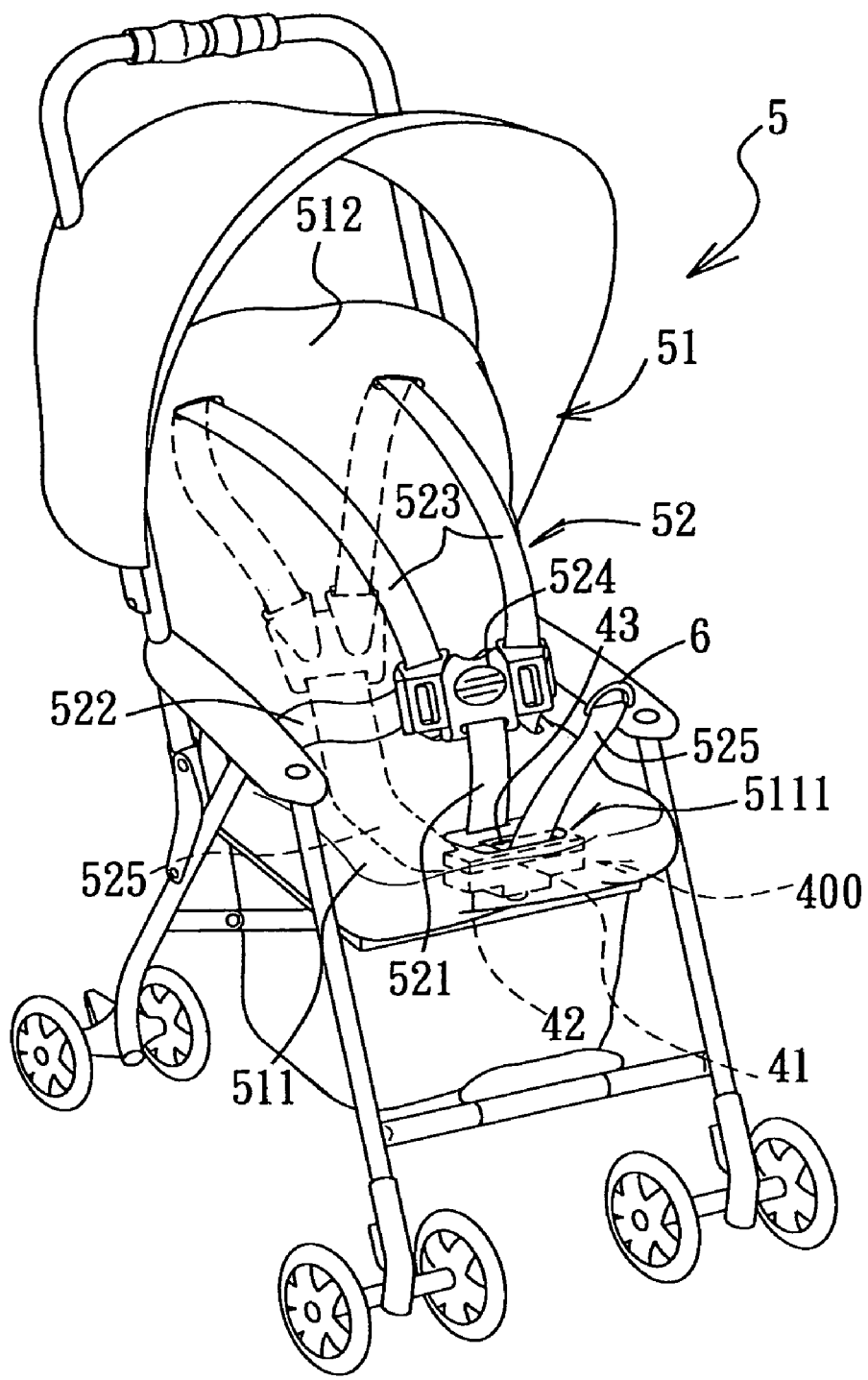
F I G. 2

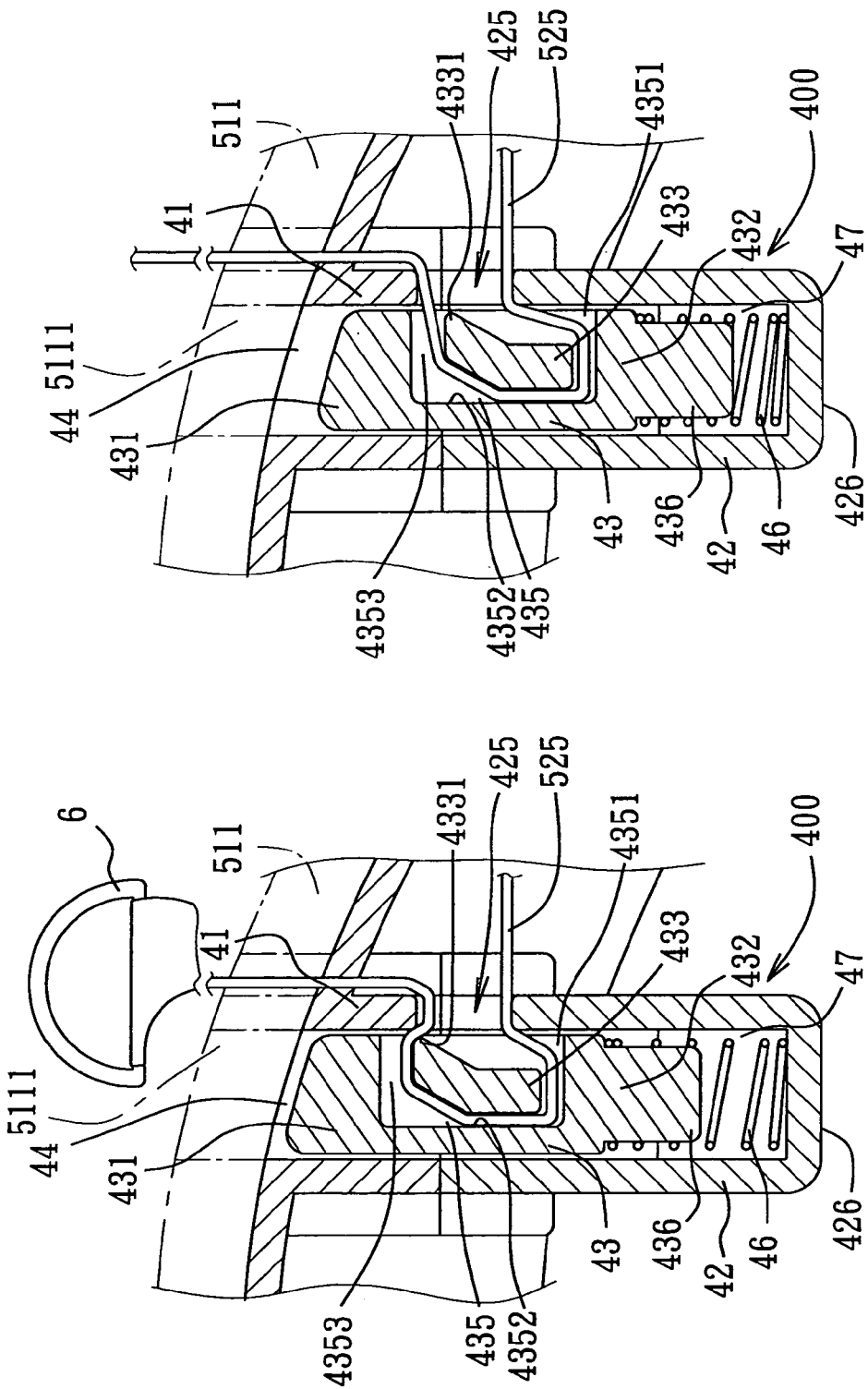

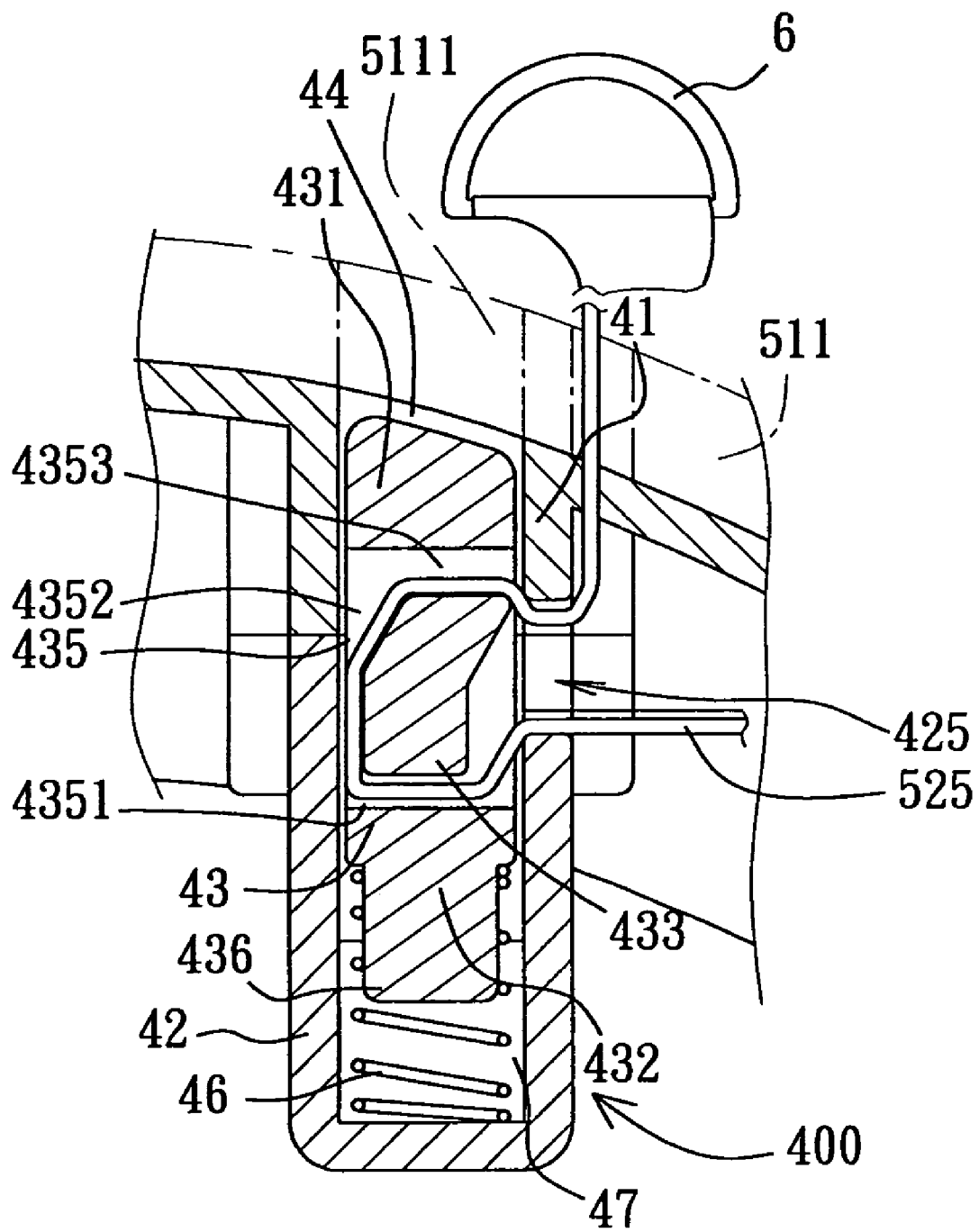
F I G. 6

STRAP-ADJUSTING DEVICE

BACKGROUND OF THE INVENTION

1. Field of the Invention

The invention relates to a strap-adjusting device, more particularly to a strap-adjusting device that is applicable to a seatbelt and that permits fast and effective strap adjustment.

2. Description of the Related Art

As shown in FIG. 1, a conventional seat 100, such as a car seat, includes a seat member 1 and a seatbelt 2. The seat member 1 has a seat portion 11 and a backrest 12 connected to the seat portion 11.

The seatbelt 2 includes a central strap 21 disposed at a front part of the seat portion 11, a main fastener 22 connected to one end of the central strap 21, a pair of side straps 23 extending from a rear part of the seat portion 11, a pair of side fasteners 24 connected to ends of the side straps 23 to engage removably the main fastener 22, a pair of shoulder straps 25 extending through the backrest 12, a connector 26 disposed behind the backrest 12 and connected to the shoulder straps 25, an anchor strap 27 interconnecting the connector 26 and a mounting member 3 on a bottom side of the seat portion 11, a pair of strap fasteners 28 connected to ends of the shoulder straps 25 to engage removably the main fastener 22, and a pair of buckles 29 provided on the shoulder straps 25 for adjusting lengths of the shoulder straps 25.

Since the buckles 29 are individually operated, adjustment of the lengths of the shoulder straps 25 takes up too much time. Moreover, individual operation of the buckles 29 makes it difficult to ensure uniform adjusted lengths of the shoulder straps 25, which can result in user discomfort and injury in case of a sudden braking action.

SUMMARY OF THE INVENTION

Therefore, the object of the present invention is to provide a strap-adjusting device that is applicable to a seatbelt and that permits fast and effective strap adjustment so as to overcome the aforesaid drawbacks of the prior art.

Accordingly, a strap-adjusting device of this invention comprises a base frame, a cover member, a strap holder, and a biasing member. The base frame is formed with an opening. The cover member is mounted on the base frame, cooperates with the base frame to form a strap-operating space that is in spatial communication with the opening, and has a lateral wall formed with a strap hole unit. The strap holder is disposed movably in the strap-operating space, and is operable for movement between a strap-retaining position and a strap-releasing position. The strap holder includes an operating portion accessible from the opening in the base frame, a biased portion, and a strap-engaging portion between the operating portion and the biased portion. The strap-engaging portion cooperates with the operating portion and the biased portion to form a strap passage unit. The biasing member is disposed in the strap-operating space to provide a biasing force that acts on the biased portion for urging the strap holder to the strap-retaining position.

In view of the aforesaid construction, when a strap is extended into the strap-operating space via the strap hole unit, is passed through the strap passage unit, and is subsequently extended out of the strap-operating space via the strap hole unit, movement of the strap holder to the strap-retaining position by virtue of biasing action of the biasing member enables clamping of the strap by the strap holder, and movement of the strap holder to the strap-releasing portion by virtue of an applied force exerted on the operating portion enables the strap holder to release the strap from being clamped.

BRIEF DESCRIPTION OF THE DRAWINGS

Other features and advantages of the present invention will become apparent in the following detailed description of the preferred embodiments with reference to the accompanying drawings, of which:

FIG. 2 is a perspective view of a stroller that incorporates the first preferred embodiment of a strap-adjusting device according to the present invention;

FIG. 4 is a partly sectional, schematic side view of the first preferred embodiment, illustrating a strap holder thereof when in a strap-retaining position;

FIG. 5 is a view similar to FIG. 4, but illustrating the strap holder when in a strap-releasing position;

FIG. 6 is a partly sectional, schematic side view of the second preferred embodiment of a strap-adjusting device according to the present invention.

DETAILED DESCRIPTION OF THE PREFERRED EMBODIMENTS

Figure 1:
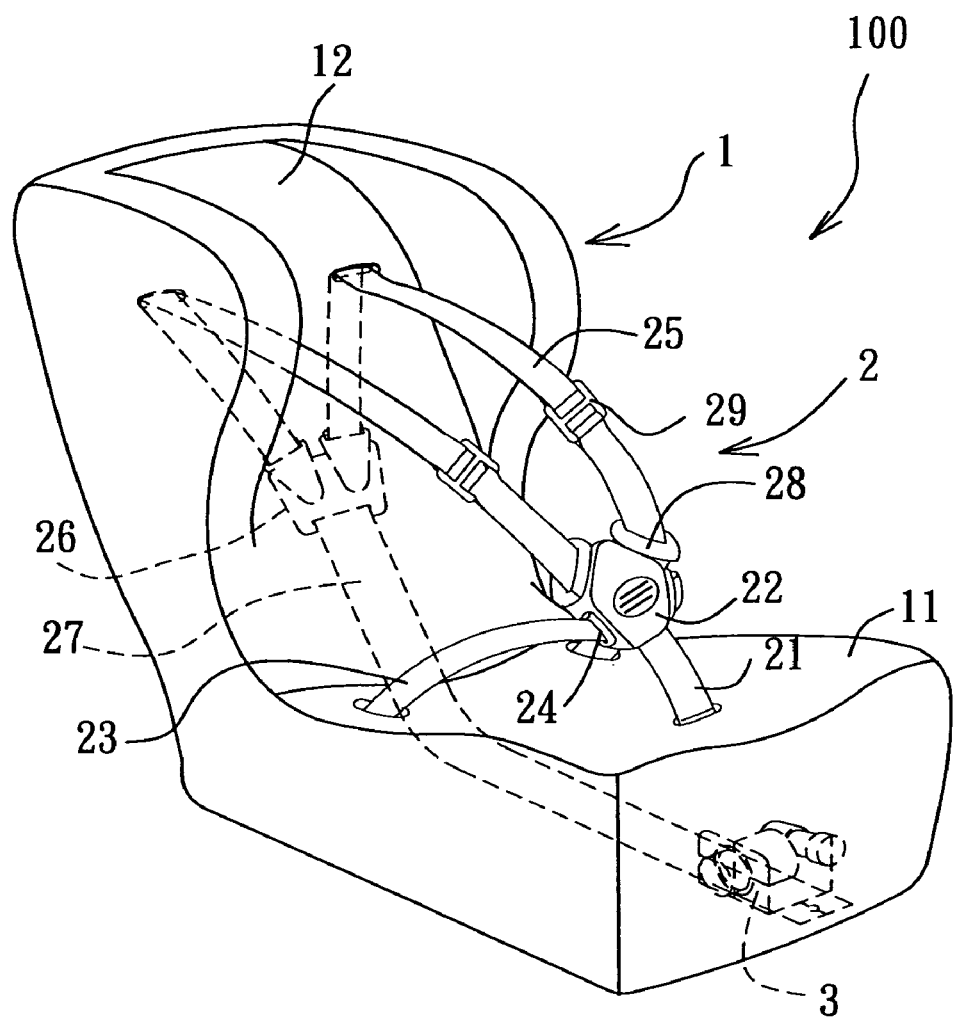
FIG. 1 is a perspective view of a conventional seat with a safety seatbelt.

Before the present invention is described in greater detail, it should be noted that like elements are denoted by the same reference numerals throughout the disclosure.

Figure 3:
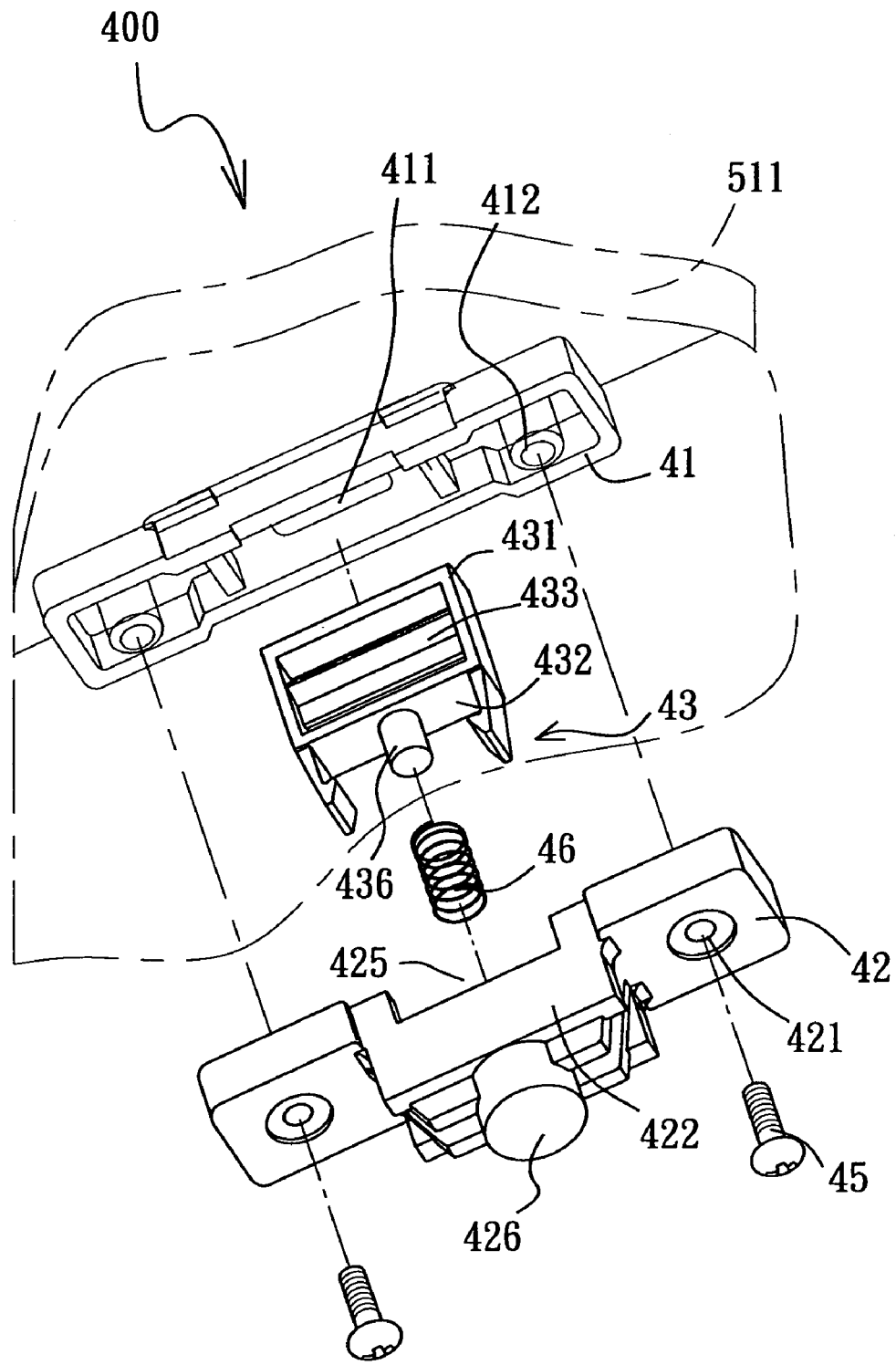
FIG. 3 is an exploded perspective view of the first preferred embodiment.

Referring to FIGS. 2 and 3, the first preferred embodiment of a strap-adjusting device 400 according to the present invention is shown to be adapted for use on a stroller 5. However, it should be apparent to those skilled in the art that the strap-adjusting device 400 of this invention may be applied to other types of seats, such as a bouncer, a car seat, a high chair, a swing, etc. The stroller 5 includes a seat member 51 and a seat belt 52. The seat member 51 has a seat portion 511 and a backrest 512 connected to the seat portion 511. The seat portion 511 has a front part formed with a through hole 5111.

The seatbelt 52 includes a central strap 521 disposed at the front part of the seat portion 511, a pair of side straps 522 extending from a rear part of the seat portion 511, and a pair of shoulder straps 523 extending through the backrest 512. A buckle unit 524 is provided to interconnect removably ends of the central strap 521, the side straps 522 and the shoulder straps 523. A fixing strap 525 is disposed behind the backrest 512, and connects the shoulder straps 523 to the strap-adjusting device 400.

In this embodiment, the strap-adjusting device 400 is mounted to a bottom side of the front part of the seat portion 511, and includes a base frame 41, a cover member 42, a strap holder 43, and a biasing member 46.

The base frame 41 is formed with an opening 411 that is registered with the through hole 5111, and a pair of locking holes 412 that are disposed on opposite sides of the opening 411.

The cover member 42 is connected removably to a lower side of the base frame 41, and cooperates with the base frame 41 to form a strap-operating space 44 (see FIGS. 4 and 5) that is in spatial communication with the opening 411. The cover member 42 is formed with a pair of fastener holes 421 that are aligned with the locking holes 412. Two screws 45 pass through the fastener holes 421 and engage the locking holes 412, thereby securing the cover member 42 onto the base frame 41. The cover member 42 has a lateral wall 422 that is formed with a strap hole unit 425, which is a single hole in this embodiment.

The strap holder 43 is disposed movably in the strap-operating space 44, and is operable for movement between a strap-retaining position (see FIG. 4) and a strap-releasing position (see FIG. 5). The strap holder 43 includes an operating portion 431 accessible from the opening 411 in the base frame 41, a biased portion 432, and a strap-engaging portion 433 between the operating portion 431 and the biased portion 432. The strap-engaging portion 433 cooperates with the operating portion 431 and the biased portion 432 to form a strap passage unit 435 that includes a first passage 4351 disposed between the strap-engaging portion 433 and the biased portion 432, a second passage 4352 in spatial communication with the first passage 4351 and disposed on one side of the strap-engaging portion 433 opposite to the strap hole unit 425, and a third passage 4353 in spatial communication with the second passage 4352 and disposed between the strap-engaging portion 433 and the operating portion 431.

The biasing member 46 is disposed in the strap-operating space 44 to provide a biasing force that acts on the biased portion 432 for urging the strap holder 43 to the strap-retaining position. In this embodiment, the biasing member 46 is a coiled compression spring. In practice, the biasing member 46 may be implemented in another form, such as a resilient plate, etc.

As shown in FIGS. 4 and 5, the cover member 42 is formed with a retaining space 47 that is in spatial communication with the strap-operating space 44, and has a support wall 426 that defines one end of the retaining space 47. The retaining space 47 is disposed proximate to the biased portion 432 and remote from the operating portion 431. The biased portion 432 is formed with a post 436 that extends in a direction away from the operating portion 431. The biasing member 46 is sleeved on the post 436, extends into the retaining space 47, and has opposite ends that abut respectively against the support wall 426 and the biased portion 432.

In use, the fixing strap 525 is extended into the strap-operating space 44 via the strap hole unit 425, is passed through the first, second and third passages 4351, 4352, 4353 of the strap passage unit 435 in sequence, and is subsequently extended out of the strap-operating space 44 via the strap hole unit 425. The distal end of the fixing strap 525 is then guided to pass through the through hole 5111 for easy access during strap adjustment.

By virtue of the biasing action of the biasing member 46, the strap holder 43 moves to the strap-retaining position such that the strap holder 43 is able to clamp the fixing strap 525 against the base frame 41, as best shown in FIG. 4. Preferably, the strap-engaging portion 433 is configured with an inverted wedge part 4331 that projects toward the base frame 41 to enhance clamping of the fixing strap 525 against the base frame 41 when the strap holder 43 is at the strap-retaining position.

In addition, by virtue of an applied force exerted on the operating portion 431, the strap holder 43 is able to move to the strap-releasing portion such that the strap holder 43 releases the fixing strap 525 from being clamped against the base frame 41, as best shown in FIG. 5.

Therefore, to tighten the shoulder straps 523, a pulling force is applied on a pull ring 6 on a distal end of the fixing strap 525. Due to the connection between the fixing strap 525 and the shoulder straps 523, the shoulder straps 523 are pulled simultaneously toward the backrest 512. Subsequently, when the pull ring 6 is released, movement of the fixing strap 525 can be resisted to hinder undesired loosening of the shoulder straps 523 in view of the biasing action of the biasing member 46. On the other hand, to loosen the shoulder straps 523, the operating portion 431 of the strap holder 43 is pressed downward to move the latter to the strap-releasing position (see FIG. 5), wherein the strap holder 43 releases the fixing strap 525 such that the shoulder straps 523 are loosened simultaneously.

In this embodiment, one end of the fixing strap 525 is extended through the strap-adjusting device 400. In practice, it is feasible to apply the strap-adjusting device 400 to the central strap 521 in order to achieve the same purpose of simultaneous adjustment of the shoulder straps 523. Moreover, the strap-adjusting device 400 is not limited for mounting on the bottom side of the front part of the seat portion 511, and should not be limited for use to the adjustment of the shoulder straps 523.

Referring to FIG. 6, the second preferred embodiment of a strap-adjusting device 400 according to this invention is shown to be similar to the previous embodiment in construction, the main difference residing in that the second passage 4352 of the strap passage unit 435 has an open side remote from the strap hole unit 425.

Figure 7:
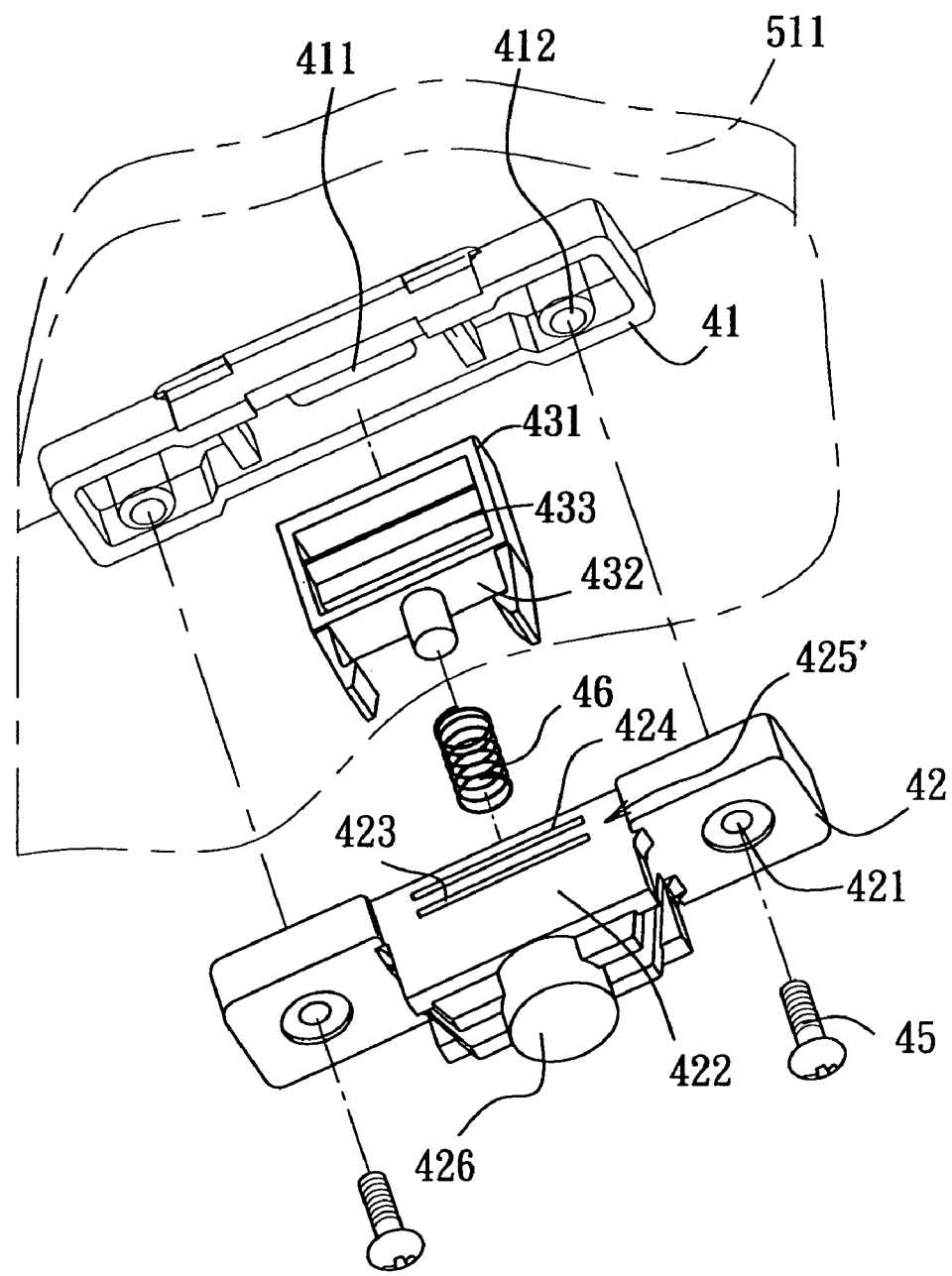
FIG. 7 is an exploded perspective view of the third preferred embodiment of a strap-adjusting device according to the present invention.

Referring to FIG. 7, the third preferred embodiment of a strap-adjusting device 400 according to the present invention is shown to differ from the previous embodiments mainly in the configuration of the strap hole unit 425' of the cover member 42. In this embodiment, the strap hole unit 425' includes an inlet part 423 proximate to the first passage 4351 (see FIG. 4), and an outlet part 424 proximate to the third passage 4353 (see FIG. 4). Unlike the previous embodiments, the inlet and outlet parts 423, 424 of the strap hole unit 425' are not spatially interconnected. The fixing strap 525 is extended into the strap-operating space 44 via the inlet part 423, and is extended out of the strap-operating space 44 via the outlet part 424.

It has thus been shown that the strap-adjusting device 400 of this invention permits fast, easy, simultaneous and uniform adjustment of a pair of straps, and is suitable for application to a wide variety of seats.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A strap-adjusting device comprising:

a base frame formed with an opening;

a cover member mounted on said base frame, cooperating with said base frame to form a strap-operating space that is in spatial communication with said opening, and having a lateral wall formed with a strap hole unit;

a strap holder disposed movably in said strap operating space and operable for movement between a strap-retaining position and a strap-releasing position, said strap holder including an operating portion actuatable from said opening in said base frame, a biased portion, and a strap-engaging portion between said operating portion and said biased portion, said strap-engaging portion cooperating with said operating portion and said biased portion to form a strap passage unit, wherein said strap-engaging portion is configured with an inverted wedge part that projects toward said base frame to permit clamping of a strap against said base frame when said strap holder is at the strap-retaining position; and a biasing member disposed in said strap-operating space to provide a biasing force that acts on said biased portion for urging said strap holder to the strap-retaining position;

whereby, when the strap is extended into said strap-operating space via said strap hole unit, is passed through said strap passage unit, and is subsequently extended out of said strap-operating space via said strap hole unit, movement of said strap holder to the strap-retaining position by virtue of biasing action of said biasing member enables clamping of the strap by said strap holder, and movement of said strap holder to the strap-releasing position by virtue of an applied force exerted on said operating portion enables said strap holder to release the strap from being clamped.

2. The strap-adjusting device as claimed in claim 1, wherein said cover member is formed with a retaining space in spatial communication with said strap-operating space, and has a support wall that defines one end of said retaining space, said biasing member extending into said retaining space and having opposite ends that respectively abut against said support wall and said biased portion.

3. The strap-adjusting device as claimed in claim 2, wherein said biasing member is a coiled compression spring.

4. The strap-adjusting device as claimed in claim 2, wherein said retaining space is disposed proximate to said biased portion and remote from said operating portion.

5. The strap-adjusting device as claimed in claim 1, wherein said biased portion is formed with a post that extends in a direction away from said operating portion, said biasing member being a coil spring sleeved on said post.

6. The strap-adjusting device as claimed in claim 5, wherein said cover member is formed with a retaining space in spatial communication with said strap-operating space, and has a support wall that defines one end of said retaining space, said biasing member extending into said retaining space and having opposite ends that abut respectively against said biased portion and said support wall.

7. The strap-adjusting device as claimed in claim 1, wherein said strap passage unit includes a first passage disposed between said strap-engaging portion and said biased portion, a second passage in spatial communication with said first passage and disposed on one side of said strap-engaging portion opposite to said strap hole unit, and a third passage in spatial communication with said second passage and disposed between said strap-engaging portion and said operating portion.

8. The strap-adjusting device as claimed in claim 7, wherein said strap hole unit includes an inlet part proximate to said first passage, and an outlet part proximate to said third passage.

9. A strap-adjusting device comprising:

a housing defined by a base frame and a cover member mounted on the base frame, the housing having first and second openings wherein said first opening in said housing is disposed in said base frame and wherein said second opening is formed in said housing at a joint between said base frame and said cover member, the housing defining a strap-operating space that is in spatial communication with said first and second openings;

a strap holder disposed movably in said strap operating space of said housing and operable for movement between a strap-retaining position and a strap-releasing position, said strap holder including an operating portion manually operable via said first opening in said housing, a biased portion, and a strap-engaging portion arranged between said operating portion and said biased portion, the strap-engaging portion having an inverted v-shaped wedge part with an apex that projects toward the second opening in said housing to permit clamping of a strap between the apex of the inverted v-shaped wedge part and an edge of the second opening in said housing when said strap holder is at the strap-retaining position; and a biasing member disposed in said strap-operating space to provide a biasing force that acts on said biased portion for urging said strap holder to the strap-retaining position;

whereby, when the strap is extended into said strap-operating space via said second opening, is passed around said strap engaging portion, and is subsequently extended out of said strap-operating space via said second opening, movement of said strap holder to the strap-retaining position by virtue of biasing action of said biasing member enables clamping of the strap by said strap holder, and movement of said strap holder to the strap-releasing position by virtue of an applied force exerted on said operating portion enables said strap holder to release the strap from being clamped.

10. The strap-adjusting device as claimed in claim 9 wherein said strap holder further includes an inlet passage and an outlet passage in said strap holder and wherein the strap-engaging portion is disposed immediately adjacent said inlet and outlet passages, said inlet and outlet passages receiving and passing the strap past the strap-engaging portion.

11. The strap-adjusting device as claimed in claim 9, wherein said cover member is formed with a retaining space in spatial communication with said strap-operating space, and has a support wall that defines one end of said retaining space, said biasing member extending into said retaining space and having opposite ends that respectively abut against said support wall and said biased portion.

12. The strap-adjusting device as claimed in claim 11, wherein said biasing member is a coiled compression spring.

13. The strap-adjusting device as claimed in claim 11, wherein said retaining space is disposed proximate to said biased portion and remote from said operating portion.

14. The strap-adjusting device as claimed in claim 9, wherein said biased portion is formed with a post that extends in a direction away from said operating portion, said biasing member being a coil spring sleeved on said post.

15. The strap-adjusting device as claimed in claim 14, wherein said cover member is formed with a retaining space in spatial communication with said strap-operating space, and has a support wall that defines one end of said retaining space, said biasing member extending into said retaining space and having opposite ends that abut respectively against said biased portion and said support wall.

16. The strap-adjusting device as claimed in claim 9, wherein the inverted v-shaped wedge part projects toward said base frame to permit clamping of the strap against said base frame when said strap holder is at the strap-retaining position.

17. The strap-adjusting device as claimed in claim 9, wherein said strap hole unit includes an inlet part proximate to said first passage, and an outlet part proximate to said third passage.

* * * * *